United States Patent [19]

Fukuda et al.

[11] 4,363,826

[45] Dec. 14, 1982

[54] EMULSIFIER COMPOSITION AND QUALITY IMPROVEMENT METHOD FOR STARCH CONTAINING FOODS

[75] Inventors: Tetsuro Fukuda, Hirakata; Hideo Matsuura, Toyonaka; Yoshihito Koizumi, Makado; Takeshi Yamaguchi, Chiba, all of Japan

[73] Assignee: Riken Vitamine Oil Co., Ltd., Tokyo, Japan

[21] Appl. No.: 292,416

[22] Filed: Aug. 13, 1981

Related U.S. Application Data

[63] Continuation-in-part of Ser. No. 107,914, Dec. 28, 1979, abandoned.

[30] Foreign Application Priority Data

| Apr. 16, 1979 | [JP] | Japan | 54-46193 |
| Nov. 19, 1979 | [JP] | Japan | 54-149770 |
| Dec. 7, 1979 | [JP] | Japan | 54-159615 |
| Dec. 17, 1979 | [JP] | Japan | 54-163882 |

[51] Int. Cl.$^3$ .............................................. A23L 1/00
[52] U.S. Cl. ................................. 426/653; 426/654; 426/19; 426/549
[58] Field of Search ................. 426/653, 654, 601; 252/351

[56] References Cited

U.S. PATENT DOCUMENTS 2,978,329  4/1961  Cochran et al. ............... 426/653
4,178,393  12/1979  Gregersen ..................... 426/653
4,229,480  10/1980  Suggs et al. .................... 426/24

FOREIGN PATENT DOCUMENTS 44-26900  10/1969  Japan .
50-34613  10/1975  Japan .

OTHER PUBLICATIONS

"Conjoined Crystals, I. Composition and Physical Properties", *Journal of the American Oil Chemists' Society*, vol. 40, (1963).

*Primary Examiner*—Raymond N. Jones
*Assistant Examiner*—Elizabeth A. Hatcher
*Attorney, Agent, or Firm*—Armstrong, Nikaido, Marmelstein & Kubovcik

[57] ABSTRACT

An emulsifier composition for use in starch-containing foods prepared by melt-mixing a composition which is composed of specific ratios of saturated fatty acid monoglyceride and cis-type unsaturated fatty acid monoglyceride; powdering the resultant mixture and thereafter tempering the powdered composition.

4 Claims, 9 Drawing Figures

EMULSIFIER COMPOSITION AND QUALITY IMPROVEMENT METHOD FOR STARCH CONTAINING FOODS

This application is a continuation-in-part of application Ser. No. 107,914 filed Dec. 28, 1979, now abandoned.

BACKGROUND OF THE INVENTION

This invention relates to a novel emulsifier composition having an excellent improvement effect for starch-containing foods. Due to their function and safety, mono- and diglycerides are widely used as emulsifiers in the present food processing industry. The function of the emulsifiers differs, depending on the purity, appearance, physical and chemical properties, and the types of fatty acid of which they are constituted.

In the case of starch containing food, such emulsifiers are required to react well, particularly with starch, to obtain a complex with the starch. Monoglyceride having a saturated fatty acid moiety of 14 to 18 carbon atoms is known to meet this requirement.

In the case of using mono- and diglycerides in the fat phase, there is no restriction on the physical properties of the mono- and diglycerides because they can be dissolved into fat. However, in case of starch-containing food, it is desirable to use a monoglyceride in the aqueous phase in order to obtain a starch-complexing improvement effect.

In these circumstances or where the monoglyceride is mixed with the raw material in powdered form, physical appearance, physical and chemical properties such as the crystalline form of the monoglyceride and, the surface condition thereof, etc. have a significant bearing on this function.

Monoglycerides are known to be polymorphic and are classified according to sub-$\alpha$, $\alpha$, $\beta'$ and $\beta$-crystalline forms which are arranged in order of increasing melting points. The $\beta$-crystalline form is the most stable thermodynamically and monoglycerides have always been marketed in the $\beta$-crystalline form.

The reason why the $\alpha$-crystalline form is more effective in the aqueous phase can be assumed to be because of a difference in hydrophilicity. As a means of obtaining the $\alpha$-crystalline form, there is a so-called conjoined crystal method employing the combined use of saturated fatty acid monoglyceride and fatty acid propyleneglycol ester (J. Am. Oil., Chem 40, 725, (1963)), or a method comprising forming a dispersion in water at a temperature below the melting point of the monoglyceride. However, each of these methods has disadvantages, such as a small content of monoglyceride, difficulty in temperature control or in preservation properties.

From these standpoints, it has long been desired to obtain a monoglyceride having the stable $\beta$-crystalline form and which, at the same time, exhibits good functional properties. Various methods have been considered to improve hydrophilic properties by increasing the surface area of crystals. As these means, there is a method whereby minute crystals of monoglyceride are obtained by recrystallization using a polar solvent (Japanese patent publication No. SHO 50-34613) and a method whereby an aqueous dispersion of the $\beta$-crystalline form is obtained by adding a stabilizer into a water-dispersion of monoglyceride or a method whereby a dry powdered monoglyceride is obtained by adding hydrophilic binders into a water-dispersion of monoglyceride (Japanese patent publication No. SHO 44-26900). Each of these methods have excellent improvement effects. However, with respect to obtaining powdered monoglyceride, the methods are disadvantageous because they tend to be expensive from the standpoint of production efficiency, and a product in paste form is inferior in handling, preservation and stability. Therefore, the development of a more simplified process has long been desired for obtaining a powdered monoglyceride which is effective in the aqueous phase. As a result of intensive research work in consideration of these shortcomings, the present inventors have discovered a novel emulsifier composition which provides good quality improvement effects to starch containing food, and which is easier to handle, less expensive, withstands longer preservation time and is stable.

SUMMARY OF THE INVENTION

The present invention relates to a novel emulsifier composition which is prepared by powdering a monoglyceride composition consisting essentially of 65–85 wt % of a saturated fatty acid monoglyceride and 35–15 wt % of a cis-type unsaturated fatty acid monoglyceride, and having an iodine value of 10 to 40, and thereafter tempering the powdered monoglyceride composition for more than 30 minutes at a temperature not below 45° C. and below the melting point of the saturated fatty acid monoglyceride.

DESCRIPTION OF PREFERRED EMBODIMENTS

In the composition according to the present invention, the number of carbon atoms for the saturated fatty acid moiety is in the range of 12–22, and that for the cis-type unsaturated fatty acid moiety is in the range of 16–22.

The composition can be produced either by using a fatty material (i.e., fat and oil) which fulfills the above requirements, or by using two or more than two different kinds of fatty acid monoglycerides.

If the amount of cis-type unsaturated fatty acid monoglyceride is less than 15% and the iodine value is less than 10, the expected results are not obtained. Likewise, if the amount is more than 35% and the iodine value is more than 40, the complex-forming ability with starch is deteriorated and, at the same time, it is difficult to obtain the composition in powdered form.

It has been discovered that, by tempering the emulsifier composition thus obtained for more than 30 minutes at a temperature which is within the range of from not below 45° C. to a temperature which does not melt the saturated fatty acid monoglyceride, the properties of the composition are improved drastically and the preservation stability is also improved. If the tempering temperature is below 45° C. it takes longer to obtain the required properties and the crystal sizes become coarse. Therefore, a lower temperature cannot satisfy both the production and expected property requirements.

When fatty acid monoglyceride is solidified by cooling, it forms the stable $\beta$-crystalline form after undergoing successive crystal formation, in order of the sub-$\alpha$, $\alpha$ and $\beta'$ forms. But as the transition time becomes longer, the crystals thus obtained become coarser. Therefore, it is necessary to finish the transition as rapidly as possible in order to obtain minutely sized crystals which meet the purpose of the invention. The most effective method is to use a solvent. The use of a solvent such as water or alcohol has already been proposed and has been put in practice at present.

However, as indicated above, problems exist in handling and preservation stability thereof. The inventors have discovered, as the result of studying the use of a polar solvent which is suitable for food in light of the above considerations, that the monoglyceride, whose fatty acid is an unsaturated fatty acid having a double bond orientated to cis-type, is suitable for the purpose of this invention. That is to say, a cis-type unsaturated fatty acid monoglyceride is well compatible with a saturated fatty acid monoglyceride in the melting state, and, from tests using a differential scanning calorimeter (DSC), it has become apparent that the resultant mixture becomes a heterogeneous mixture when the mixture is cooled to form a crystallized saturated fatty acid monoglyceride. As a result, the inventors have discovered that the cis-type unsaturated fatty acid monoglyceride is excellent as a polar solvent compatible with the saturated fatty acid monoglyceride.

Figure 1:
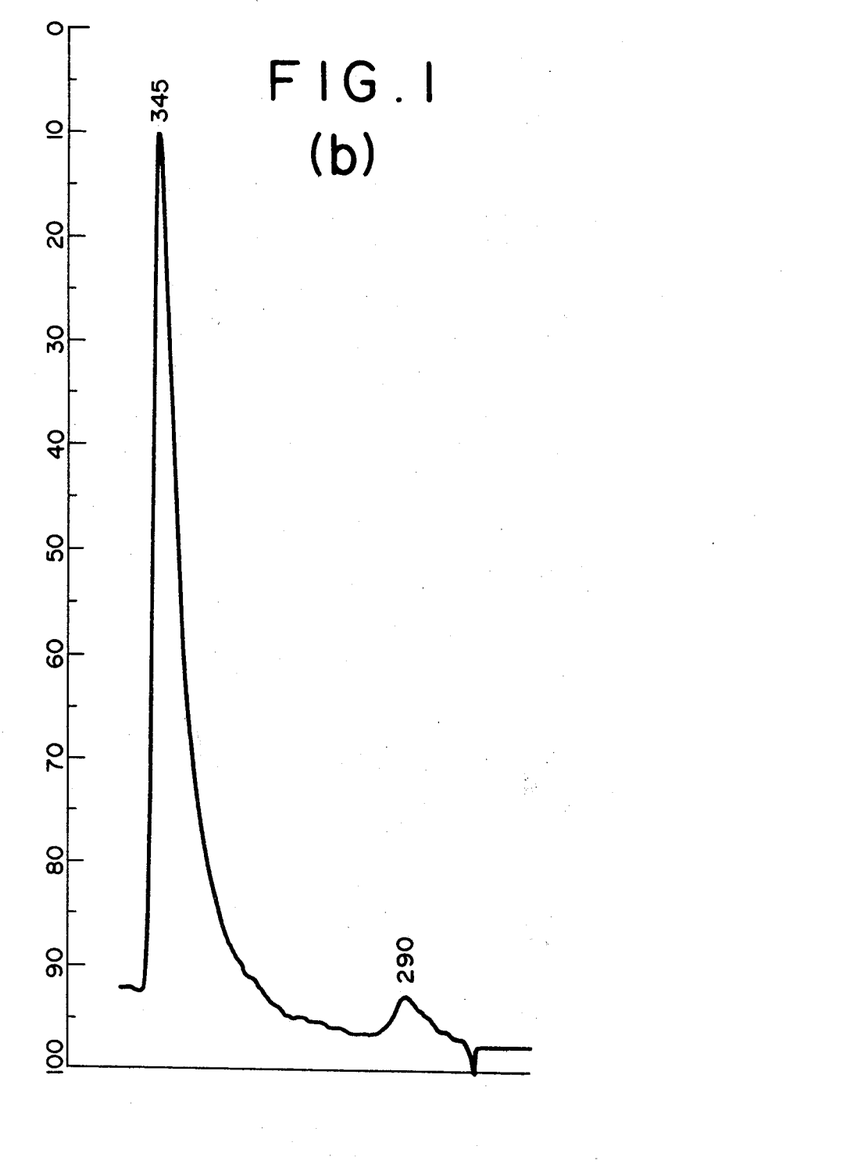
Figure 1A:
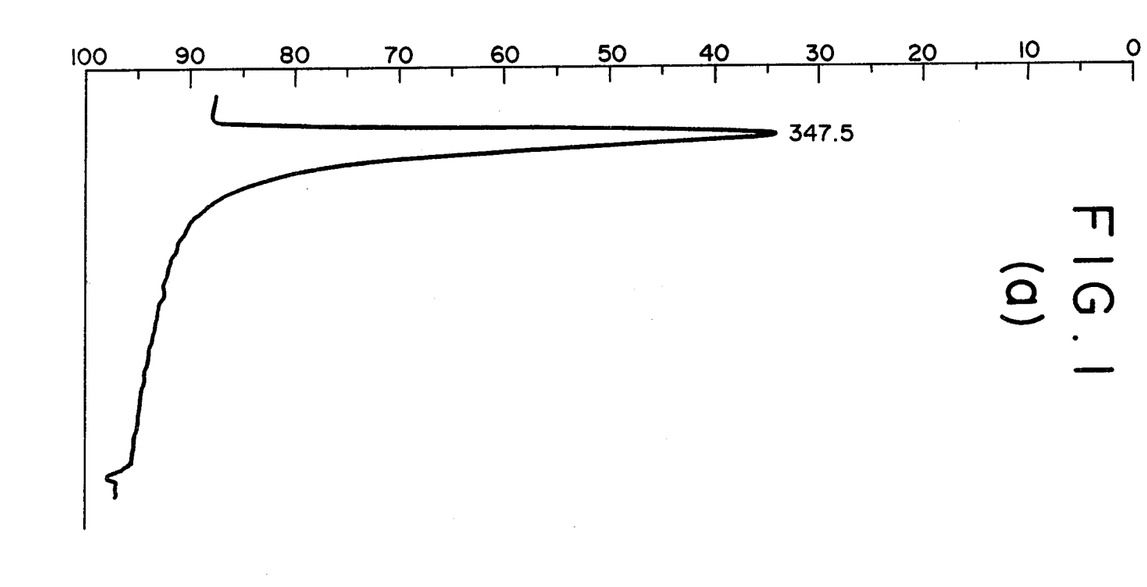
Figure 1C:
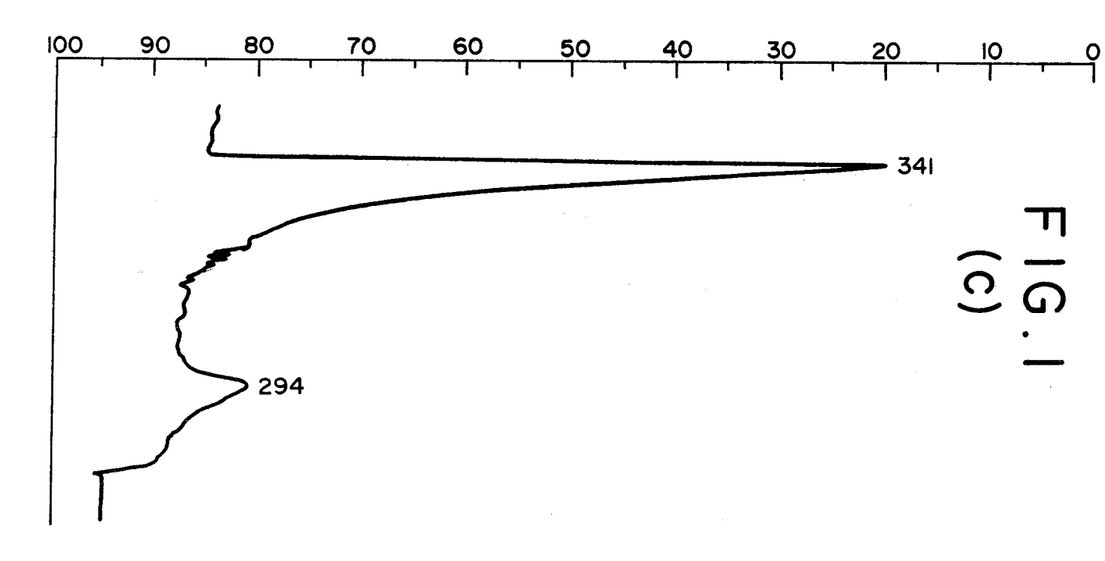

After taking various mix-melted mixtures of distilled monoglycerides of fully hardened palm oil and distilled olive oil monoglyceride on a pan for measurement of DSC and then tempering the mixtures at 45° C. for 3 days in order to avoid disturbances which come from polymorphism of monoglyceride, the peak temperatures of heat-absorbing thereof were measured by using Perkin-Elwer DSC 1B type. The results are shown in Table 1, and FIG. 1 (a)(b)(c).

TABLE 1

Fatty acid composition of monoglyceride, iodine value and peak temperature of heat-absorbing of monoglyceride.

| | saturated fatty acid monoglycerides | | Peak temperature of heat absorbing (°K.) | |
|---|---|---|---|---|
| | cis-type unsaturated fatty acid monoglycerides | Iodine Value | By cis-type unsaturated fatty acid monoglyceride | By saturated fatty acid monoglyceride |
| * | 100/0 | 0 | — | 347.5 |
|  | 90/10 | 9.8 | 287 | 346 |
|  | 85/15 | 15.4 | 290.5 | 345 |
| ** | 80/20 | 20.6 | 290 | 345 |
|  | 75/25 | 25.9 | 293 | 343.5 |
| *** | 65/35 | 35.8 | 294 | 341 |

Note: The composition of the fatty acid is:

| | $C_{16}$ | $C_{18}$ | cis-$C_{18-1}$ | cis-$C_{18-2}$ |
|---|---|---|---|---|
| distilled monoglyceride of fully hardened palm oil | 43 | 57 | — | — |
| distilled olive oil monoglyceride | 6 | 4 | 83 | 7 |

*FIG. 1(a)
**FIG. 1(b)
***FIG. 1(c)

As indicated above, the suitable percentages of saturated fatty acid monoglyceride and of cis-type unsaturated fatty acid monoglyceride are 65–85% for the former and 35–15% for the latter. From the standpoint of complex forming ability with starch, it is more advantageous to have as high a content of saturated fatty monoglyceride as possible in the mixture for the improvement of functional properties. Depending on the kinds of fatty acids, saturated fatty acid monoglyceride has different polymorphic melting points. But, for a difference in number of carbon atoms of saturated fatty acid moiety within 4, saturated fatty acid monoglycerides form a solid solution. Therefore, saturated fatty acid monoglyceride can be handled behaviorally as one fatty acid monoglyceride (Japan oil chemistry 28, No. 2, 100–105 (1979)).

The process for preparing the composition of this invention consists of three stages as follows. As the first stage, a mix-melted composition of fatty acid monoglyceride is powdered in the atmosphere at below 35° C. In this instance, cis-type unsaturated fatty acid monoglyceride, which is a minor constituent, is solidified among crystals of saturated fatty acid monoglyceride. According to the research using DSC, just after being powdered in such an atmosphere, it is ascertained that the composition has already become a heterogeneous composition in the constitution thereof, although stabilizing of the crystalline forms thereof is incomplete. To illustrate this fact, a composition prepared by mixing distilled monoglyceride of fully hardened palm oil and distilled palm oil monoglyceride so as to have iodine value of 22 (unsaturated ratio being 28%) was melted and was powdered through a spraying process in an atmosphere of 30° C. or 10° C. The resultant powder was subjected to DSC measurement. Diagrams of these measurements are shown in FIG. 2 (a)(b).

Figure 2:
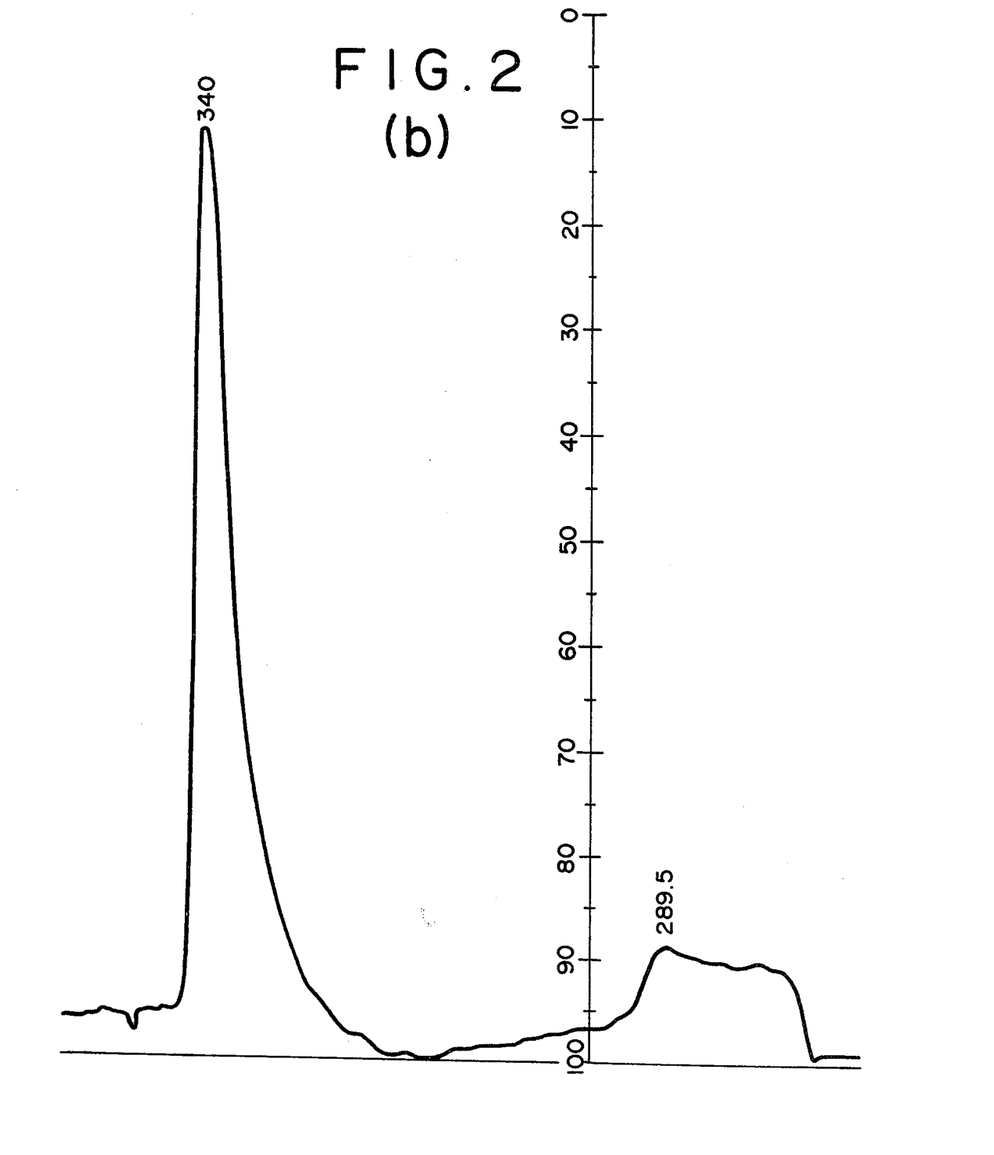
Figure 2A:
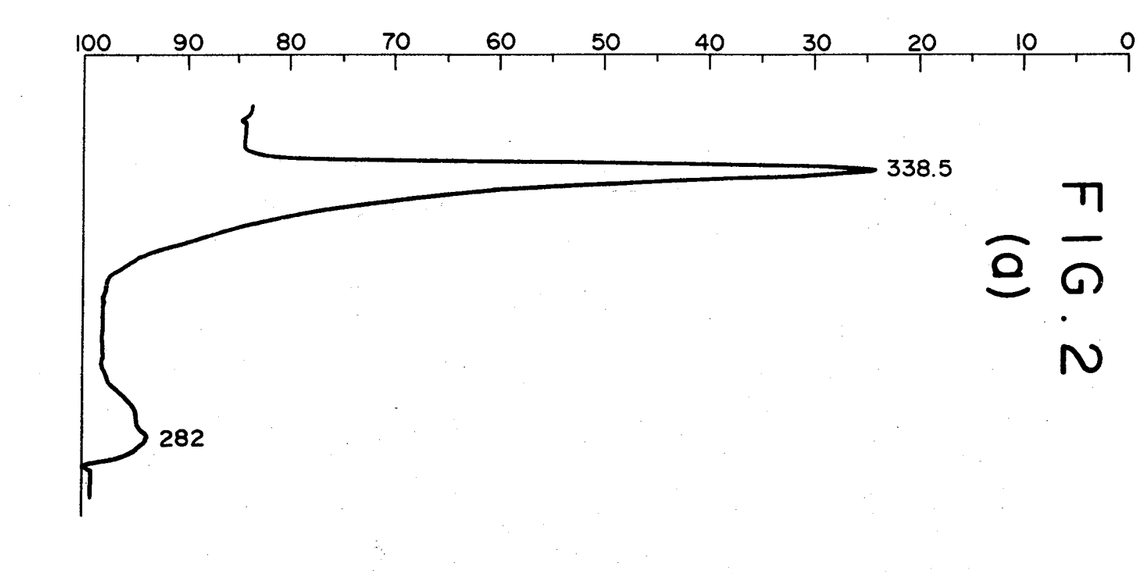

As obvious from FIG. 2 (a)(b), peaks of heat-absorbing by cis-type unsaturated monoglyceride and saturated monoglyceride are respectively observed.

Figure 2C:
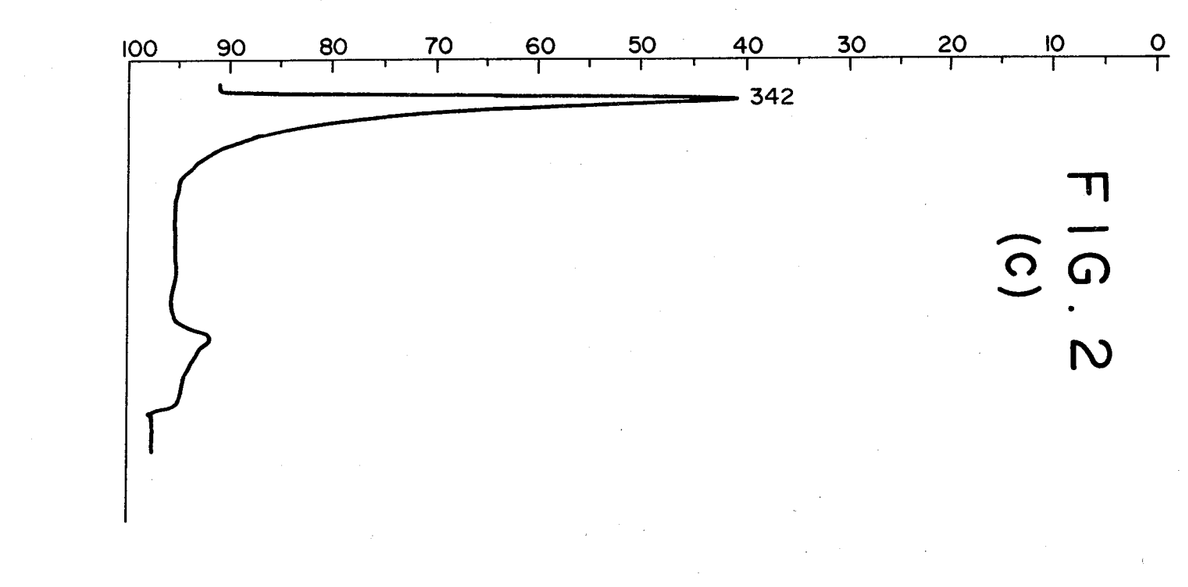

A powder obtained by powdering by means of a spraying process in an atmosphere of 30° C. was subjected to tempering at 50° C. for 2 hours, and the tempered powder was subjected to DSC measurements. The result thereof is shown in FIG. 2(c). As obvious from FIG. 2(c), it is recognized that a peak temperature at the high temperature side (melting point of saturated fatty acid monoglyceride) was shifted to a high temperature (338.5→342° K.), which is based on the fact that the heterogeneous state thereof is maintained and stabilizing of the crystalline forms thereof is carried out.

The second stage is a transition stage of the crystalline form and which is done by tempering. The tempering temperature is desired to be above the melting point of sub-α crystalline forms of saturated fatty acid monoglyceride and is ordinarily necessary to be not below 45° C. This tempering process melts the cis-type unsaturated fatty acid monoglyceride and makes saturated fatty acid monoglyceride crystallize in a minute form and make it stabilized. In this case, the appropriate degree of tempering and the solvent effect of the cis-type unsaturated fatty acid monoglyceride accelerate the transition of crystal to the β-crystalline form. Normal tempering is 2–8 days at about 45° C. or 30 minutes to one day at 50°–55° C.

The third stage is a cooling stage of the tempered monoglyceride to give the product. The product obtained has excellent properties and is stable for a long period of time.

The emulsifier composition of this invention is based on the discovery that it is remarkably effective to employ cis-type unsaturated fatty acid monoglyceride, which has a strong affinity to water, as a medium in order to give the affinity to water to the fine crystals of saturated fatty acid monoglyceride. It is also clear that, even if the crystalline form of saturated fatty acid monoglyceride is the β or β'-type, cis-type unsaturated fatty acid monoglyceride, which is excellent in affinity to water and is capable of absorbing water instantly, exists, between gaps of the above fine crystals in state of a thin film and allows the fine crystals of saturated fatty acid monoglyceride to be sufficiently in contact with water to give the greatest effect.

Among the compositions disclosed in the above-described invention, fatty acid monoglyceride, which is composed of cis-type unsaturated fatty acids is, on one hand, a good solvent and is low in compatibility with saturated fatty acid monoglyceride. On the other hand, it is largely hydrophilic even at a low temperature. Therefore, among saturated fatty acid monoglyceride, cis-type unsaturated fatty acid monoglyceride, when added with water, serves as a disintegrator and disperses saturated fatty acid monoglyceride in the aqueous phase. Monoglyceride which is composed of trans-type unsaturated fatty acids has a straight chain structure and a high melting point and is largely compatible with saturated fatty acid monoglyceride and is believed to form a condition which is close to the solid solution state. Therefore, this cannot be treated in the same manner as that of the cis type.

On the one hand, both trans-type unsaturated fatty acid monoglyceride and cis-type unsaturated fatty acid monoglyceride pertain to the same unsaturated fatty acid series, and therefore they are presumed to have high compatibility with each other. If this presumption comes into being, a ternary mixture of saturated fatty acid monoglyceride, trans-type unsaturatedfatty acid monoglyceride is considered to form a solid solution at the time of cooling, depending on the ratio of mixing.

On the other hand, according to the method of partially hydrogenating oil and fat which is commercially available, the formation of trans-type isomer cannot be avoided, although the degree of formation thereof varies with the degree of hydrogenation.

Accordingly, if the raw material of fatty acid in the unsaturated fatty acid monoglyceride is partially hydrogenated oil and fat or partially hydrogenated fatty acid, it is presumed that there is a case wherein the mixture of the unsaturated fatty acid monoglyceride and the saturated fatty acid monoglyceride forms a solid solution.

Figure 3:
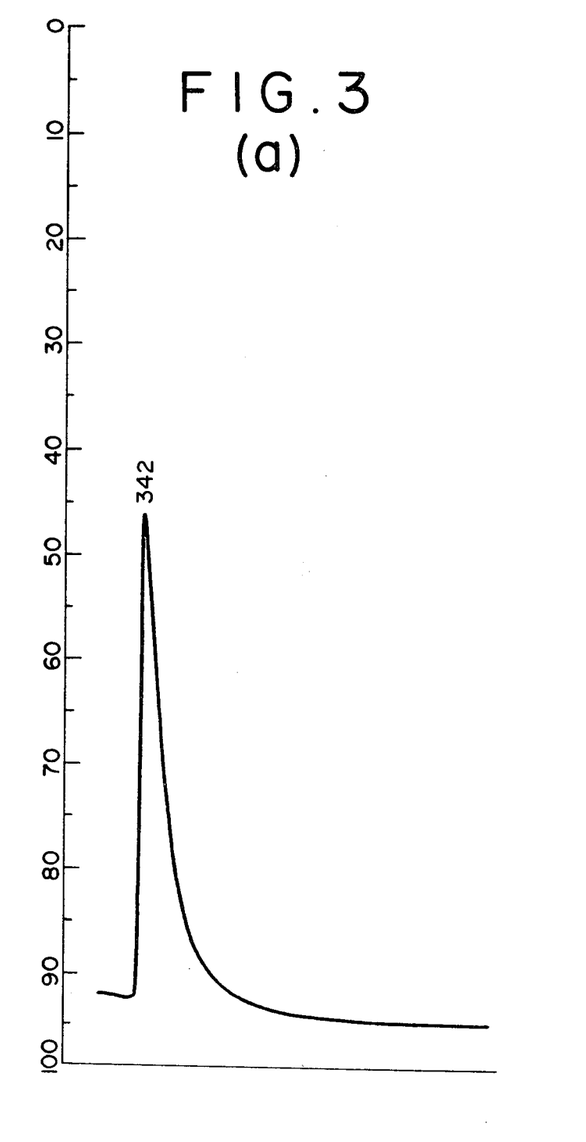

The inventors demonstrated that the above presumption was right by research using DSC concerning the mixture of distilled monoglyceride of fully hardened palm oil and distilled monoglyceride of partially hydrogenated soy-bean oil. Several kinds of mixtures of distilled monoglyceride of fully hardened palm oil and distilled monoglyceride of partially hydrogenated soy-bean oil were powdered by spraying in the atmosphere of 30° C., and the resultant powder was subjected to tempering at 50° C. for 1 day. Thereafter, the tempered powder was subjected to DSC measurement and the peak temperature of heat-absorbing thereof was measured. The result is shown in FIG. 3 (a) (b) and Table II. The composition of the fatty acid was:

|  | $C_{16}$ | $C_{18}$ | $C_{18-1}$ | $C_{18-2}$ |
|---|---|---|---|---|
| Distilled fully hardened palm oil monoglyceride | 43 | 57 | — | — |
| Distilled partially hydrogenated soy-bean oil monoglyceride | 10 | 20 | 70* | trace |

*trans-type 34%

TABLE II

| | Mixing Ratio (%) | | |
|---|---|---|---|
| | Distilled monoglyceride of fully hardened palm oil | Distilled monoglyceride of partially hydrogenated soy-bean oil | Iodine Value |
| FIG. 3(a) | 55 | 45 | 23 |

TABLE II-continued

| | Mixing Ratio (%) | | |
|---|---|---|---|
| | Distilled monoglyceride of fully hardened palm oil | Distilled monoglyceride of partially hydrogenated soy-bean oil | Iodine Value |
| FIG. 3(b) | 67 | 33 | 17 |

In both cases of FIG. 3(a) and (b), a peak in the vicinity of 300° K., which comes from oleic acid monoglyceride, is not found. Only a single peak is found. From this, it becomes clear that the ternary mixture of saturated fatty acid monoglyceride, trans-type unsaturated fatty acid monoglyceride and cis-type unsaturated fatty acid monoglyceride forms a solid solution, depending on the mixing ratio thereof. The fatty acid monoglyceride composed of binary system of saturated fatty acid monoglyceride and a definite amount of trans-type unsaturated fatty acid monoglyceride or ternary system of the saturated fatty acid monoglyceride, the trans-type unsaturated fatty acid monoglyceride and cis-type unsaturated fatty acid monoglyceride sometimes forms a solid solution. In case of forming a solid solution, the wettability to water of this composition is low, and therefore it cannot achieve the object of this invention.

The unsaturated fatty acid monoglyceride in this invention is to be limited to cis-type, but not to perfect cis-type. In other words, although animal or vegetable oil which exists in nature and is not subjected to hydrogenation sometimes contains several percentages of trans-type unsaturated fatty acid moiety as its fatty acid, unsaturated fatty acid moiety of this oil can be deemed to be substantially cis-type unsaturated fatty acid. Also, in the case of a fatty acid having two or more than two double bonds in one molecule thereof, the case of at least one double bond being cis-type should be included in the scope of this invention.

There is no limitation in the method of powdering in this invention, but a method of heat-melting the emulsifier composition and thereafter powdering through process of spray cooling is effective. The particle size of the powder has preferably a distribution of particle size in which particles of about 42–80 mesh correspond to the medium particle size. If the particle size thereof becomes coarse, the function of the powder is lowered, and if the particle size thereof becomes fine, the handling of the powder is deteriorated. However, some variation in the particle size is permitted, because the degree of lowering of the function and handling are comparatively small. Furthermore, the function of this invention can be promoted by a combined use with the following substances. That is to say, a combined composition ion which not more than 5% of at least one kind of alcohols, organic acids, lecithin and stearoyl lactylate are added to the fatty acid monoglyceride composition consisting essentially of 65–85% of saturated fatty acid monoglyceride and 35–15% of cis-type unsaturated fatty acid monoglyceride having an iodine value of 10–40, shows an elevated function when the combined composition is mix-melted, then powdered and thereafter is subjected to tempering, for more than 30 minutes, at a temperature of not below 45° C. and which is below the melting point of the included saturated fatty acid monoglyceride. The substances used together with the fatty acid monoglyceride composition for the above purpose provide a thermodynamic action on the composition to promote both atomization of crystals of saturated fatty acid monoglyceride and formation of the thin film of cis-type unsaturated fatty acid monoglyceride and contribute to elevating the function thereof by the tempering process.

Alcohols which can be used include propylene glycol, glycerol and the like. Organic acids can be selected from citric acid, malic acid, fumaric acid, succinic acid, glutamic acid, tartaric acid, lactic acid, etc. Soy bean lecithin, egg yolk lecithin etc., can be used as lecithin and lactylic stearate, sodium stearoyl-2-lactylate, calcium stearoyl-2-lactylate, etc. can be used as the stearoyl lactylate.

These substances show an effect when added to the emulsifier composition in an amount of less than 5%. It is not desirable to increase the used amount of these substances, as the content of emulsifier component decreases.

It has been determined that the crystalline forms of saturated fatty acid monoglyceride in the emulsifier composition obtained by this invention are $\beta$-type crystalline form for the most part and $\beta'$-type crystalline form for a minor part using X-ray diffraction analysis, differential thermal analysis, and differential scanning calorimeter. Accordingly, it can be understood that the emulsifier composition of this invention is excellent in the function and stability thereof.

In case of using the emulsifier composition of this invention, it is sufficient to mix it with powder which is a raw material of foods or water, and therefore, it excels in the handling thereof. The efficiency of the emulsifier composition by this invention can be evaluated by Blue Value (hereinafter abbreviated "BV"), because its efficiency appears mainly by forming a complex with starch. BV is based on utilizing iodine-starch reaction, and when starch forms a complex with fatty acid monoglyceride, coloring of starch by iodine is depressed and therefore the degree of formation of the complex, i.e., the efficiency of the emulsifier composition can be evaluated by measuring its absorbance.

Accordingly, it is shown that the lower the value of BV, the larger the amount of formation of the complex, and the better the efficiency of the emulsifer. For practical use, a value of BV or less than 0.300 is adequate.

The emulsifier composition disclosed under this invention is capable of improving the quality of starch containing food by being added directly to the starch containing food or to the mix. This composition exerts excellent quality improvement effect in making bread, pastries, pan cake, noodles, cookies, food made from fish and livestock and the said mix. Since it exerts excellent quality improvement effects by mixing with water, comparable effects were recognized in fat and water-based foods and in protein-containing foods.

The composition is not limited to use in the aqueous phase, but can also be used in a fat phase.

BRIEF EXPLANATION OF DRAWING

FIGS. 1(a), (b), (c); FIGS. 2(a), (b), (c); and FIGS. 3(a), (b) show the results of D.S.C. measurements with change of the composition.

The following are embodiments of the present invention.

EXAMPLE 1

A mixture of equivalent amounts of distilled monoglyceride of refined palm oil and distilled monoglyceride of fully hardened palm oil were melted and spray-cooled to obtain a powder with a medium size of 60 mesh. The powder was immediately placed into a tempering room at a temperature of 50° C. and discharged from the tempering room after a lapse of one hour. The temperature of the powder was then lowered to room temperature. Thus the product of the invention was obtained. The composition of the fatty acid, iodine value, BV and results of a bread making test are indicated in Table III. The composition of this invention show excellent performance values as compared to the non-tempered product and to a commercially available hardened oil fatty acid monoglyceride (conventional example).

EXAMPLE 2

The product of this example was made by the method indicated in Example 1 from a melt mix made of 75 weight % of fully hardened soybean oil distilled monoglyceride and 25 weight % of olive oil distilled monoglyceride. The test results of this product are indicated in Tables III and IV.

Test method by B.V.: Test material of 0.02 g was added to 40 ml of 0.5% starch solution at 32° C. and shaken. After shaking, 1 ml of 0.02 N iodine solution was added to 2.5 ml of the above starch solution and the obtained solution was blended well by shaking. Then this solution was diluted with distilled water up to 100 ml. Absorbance was measured by spectrophotometry at a wavelength of 660 nm after filtering. The temperature of solution was kept at 32° C. when handling.

Bread making test method: By sponge-dough method (AACC method). The added amount of emulsifier composition (as emulsifier) to wheat flour was 0.4%. The dough test was done by sensory inspection. Baked bread was left at 20° C. and the degree of aging retardation was measured.

Evaluation of Dough Test

O: very good, dryness and good spreadability
Δ; poor, slightly sticky and inferior in-spreadability
X; bad, sticky and can not handle

TABLE III

Test Results of Fatty Acid Composition, Iodine Value, BV and Bread Making Test.

| Experiment No. | Analysis properties Testing material | Composition of fatty acid (%) | | | | Iodine value | B.V. | Dough test | Aging retardation effect (g/2mm) | | | |
|---|---|---|---|---|---|---|---|---|---|---|---|---|
| | | $C_{16}$ | $C_{18}$ | $C_{18'}$ | $C_{18''}$ | | | | 1st day | 2nd day | 3rd day | 4th day |
| 1 | Composition of Example 1 | 48 | 28 | 17 | 4 | 20 | 0.100 | O | 110 | 164 | 200 | 223 |
| 2 | Non tempered product of above | Same as above | | | | | 0.340 | Δ | 125 | 180 | 225 | 260 |
| 3 | Composition | 11 | 65 | 20 | 2 | 17 | 0.100 | O | 103 | 146 | 190 | 220 |

TABLE III-continued

Test Results of Fatty Acid Composition, Iodine Value, BV and Bread Making Test.

| Experiment No. | Analysis properties Testing material | Composition of fatty acid (%) | | | | Iodine value | B.V. | Dough test | Aging retardation effect (g/2mm) | | | |
|---|---|---|---|---|---|---|---|---|---|---|---|---|
| | | $C_{16}$ | $C_{18}$ | $C_{18'}$ | $C_{18''}$ | | | | 1st day | 2nd day | 3rd day | 4th day |
| 4 | Non tempered product of above of Example 2 | Same as above | | | | | 0.420 | Δ | 133 | 188 | 230 | 267 |
| 5 | Commercially* available composition for bread making | 33 | 64 | trace | — | 0.3 | 0.140 | O | 115 | 168 | 220 | 230 |
| 6 | Blank | | | | | | 0.780 | X | 140 | 205 | 248 | 282 |

*Commercially available Emulsy-MM-100 (manufactured by Riken Vitamin), including 80% of monoglyceride, in powder form.

Aging retardation test method: This was done by measuring the stress to 200 g weight of bread adapter using a rheometer. Values were measured from 5 pieces of 5 cm squared 2 cm thick test pieces from the central portion of the bread. The smaller the measured value, the greater the aging retardation effect.

TABLE IV

Properties Stabilities (B.V.)

| Experiment No. | Number of lapsed days Testing material | 2 | 30 | 60 | 180 |
|---|---|---|---|---|---|
| 7 | Composition of Example 2 | 0.090 | 0.100 | 0.100 | 0.110 |

Preservation condition: In a room temperature of 25°-30° C.

EXAMPLE 3

The mixtures of distilled monoglyceride of fully hardened soy-bean oil and distilled olive oil monoglyceride having various mixing ratios were mix-melted and spray-cooled to give powders, temperature of which were 20° C. These powders were placed in a tempering room at 50° C., taken out of the room after one hour and cooled to give powders having an average particle size of 60 mesh.

On the other hand, an aqueous dispersion of fully hardened soybean oil distilled monoglyceride was prepared and likewise its properties were also compared. The results are indicated in Table V.

TABLE V

Composition of Fatty Acids, Iodine Value and Properties Tests (BV).

| Experiment No. | Saturated fatty acid in the monoglyceride thereof | Unsaturated fatty acid in the monoglyceride thereof | Properties evaluation | |
|---|---|---|---|---|
| | | | Iodine value | BV |
| 8 | 90/10 | | 9.8 | 0.370 |
| 9 | 85/15 | | 15.4 | 0.200 |
| 10 | 80/20 | | 20.6 | 0.150 |
| 11 | 75/25 | | 25.9 | 0.065 |
| 12 | 70/30 | | 31.1 | 0.085 |
| 13 | 65/35 | | 35.8 | 0.090 |
| 14 | 100/0 | Aqueous dispersion | — | 0.085 |
| 15 | Blank | | — | 0.745 |

Note: The fatty acid % is as follows:

| | $C_{16}$ | $C_{18}$ | $C_{18'}$ | $C_{18''}$ |
|---|---|---|---|---|
| Fully hardened soybean oil distilled monoglyceride | 20 | 80 | | |

TABLE V-continued

Composition of Fatty Acids, Iodine Value and Properties Tests (BV).

| Experiment No. | Saturated fatty acid in the monoglyceride thereof | Unsaturated fatty acid in the monoglyceride thereof | Properties evaluation | |
|---|---|---|---|---|
| | | | Iodine value | BV |
| | Olive oil distilled monoglyceride | 6 | 4 | 83 | 7 |

When the content of cis-type unsaturated fatty acid monoglyceride in the composition is above 35%, the powdering process becomes difficult. The ratio of saturated fatty acid monoglyceride to cis-type unsaturated fatty acid monoglyceride, therefore, is preferably 85/15–70/30.

From the above results, the composition of fatty acid monoglycerides and iodine value applicable for this invention can be recognized.

EXAMPLE 4

Figure 4:
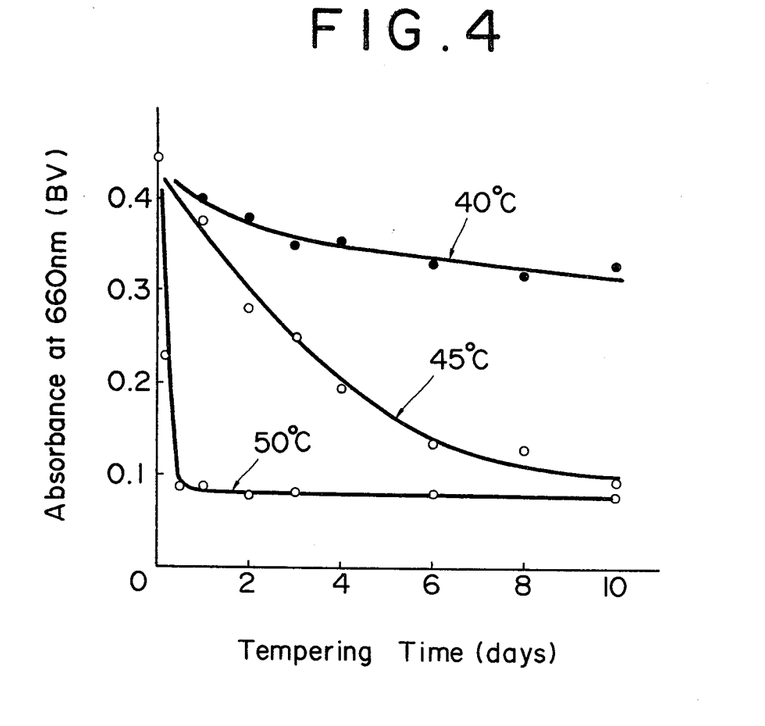
FIG. 4 is a digram showing change of BV with lapse of time by tempering the composition of this invention during its preparation.

Distilled monoglyceride of fully hardened palm stearin and distilled monoglyceride of refined palm oil were mix-melted (the mix ratio of saturated fatty acid versus unsaturated fatty acid was 76.5:23.5) and powdered in the manner described in Example 1, and separate samples were tempered at a temperature of 40° C., 45° C. and 50° C. The blue value was measured to note the secular change of properties. Iodine value of this composition was 23. The results are indicated in FIG. 4.

From these results it is seen that an improvement effect is not brought about at a tempering temperature of 40° C. With the tempering temperature of 45° C. an improvement effect is observed after 2–8 days and at a tempering temperature of 50° C. a drastic improvement effect is recognized after 30 minutes–2 hours.

EXAMPLE 5

Citric acid, calcium stearoyl-2-lactylate, lecithin and propylene glycol were added to the composition indicated in Example 1 and the resultant mixtures were mix-melted, powdered, in the manner described in Example 1, and tempered for 2 days at 45° C. to give a product. The results are indicated in Table VI. It was found that tempering was effective to improve the properties of the compositions and that the properties remained stable for a long time.

TABLE VI

Additional Effects of Various Substances (BV readings)

| | | Tempering | | | |
|---|---|---|---|---|---|
| | | Yes | | No | |
| | | Preservation time | | | |
| Experiment No. | Additive | A At time of preparation | B 3 months | C At time of preparation | D 3 months |
| 16 | none | 0.100 | 0.110 | 0.360 | 0.380 |
| 17 | Citric acid 1% | 0.075 | 0.080 | 0.250 | 0.260 |
| 18 | CSL* 3% | 0.080 | 0.080 | 0.180 | 0.185 |
| 19 | Lecithin 2% | 0.095 | 0.105 | 0.280 | 0.295 |
| 20 | Propylene glycol 2% | 0.080 | 0.090 | 0.250 | 0.275 |
| 21 | 1% citric acid 2% lecithin 2% propylene glycol | 0.050 | 0.055 | 0.160 | 0.160 |

*calcium stearoyl-2-lactylate

Additions of citric acid and CSL showed fairly favorable results.

EXAMPLE 6

To the composition composed of 75 parts by weight of distilled monoglyceride of fully hardened soy-bean oil and 25 parts by weight of distilled olive oil monoglyceride (iodine value 17 and composition of fatty acids: $C_{16}$: 11%; $C_{18}$: 65%; $C_{18'}$: 20%; $C_{18'''}$: 2%) citric acid, malic acid, propylene glycol, soy-bean lecithin, calcium stearoyl-2-lactylate, etc., were added and the resultant mixtures were mix-melted and spray-cooled to give powders having a medium particle diameter of 60 mesh.

A portion of each of the powders was subjected to tempering at 50° C. for 40 minutes. The results are shown in Table VII. The tempered powders show an improved performance and good stability for a long time.

TABLE VII

Effect of addition of Various Substance (BV)

| | | Tempering | | | |
|---|---|---|---|---|---|
| | | Yes | | No | |
| | | Preservation time | | | |
| Experiment No. | Additive | A At time of preparation | B 3 months | C At time of preparation | D 3 months |
| 22 | None Comparative example | 0.100 | 0.110 | 0.420 | 0.450 |
| 23 | Citric acid 1% (This invention) | 0.077 | 0.082 | 0.255 | 0.260 |
| 24 | Malic acid 1% (This invention) | 0.080 | 0.085 | 0.260 | 0.266 |
| 25 | Propylene glycol 2% (This invention) | 0.082 | 0.090 | 0.256 | 0.269 |
| 26 | Soy lecithin 2% (This invention) | 0.095 | 0.106 | 0.285 | 0.295 |
| 27 | CSL* 3% (This invention) | 0.081 | 0.088 | 0.181 | 0.187 |
| 28 | Citric acid 1% soy lecithin 1% propylene glycol 2% (This invention) | 0.050 | 0.055 | 0.165 | 0.165 |

*CSL: calcium stearoyl-2-lactylate

As obvious from the data of the above table, the addition of citric acid, malic acid, CSL or propylene glycol or a combination thereof produces good results.

EXAMPLE 7

Breadmaking experiments were conducted on test products obtained from Experiment No. 8, No. 10 and No. 12 of Example 3.

Breadmaking test method: By sponge-dough method (AACC method). The added amount of emulsifier composition (as emulsifier) to wheat flour was 0.4%. The dough test was done by sensory inspection. Baked bread was left at 20° C. and the degree of aging retardation was measured.

Aging retardation test methods: 5 test specimens of 5 cm square and 1.5 cm in thickness were taken from the central portion of the bread and were measured by a Texturometer (manufactured by General Foods) (plunger: 5 cm in diameter, 10 flat dish, clearance: 5 mm, low speed electric voltage: 2 V).

The results are indicated in Table VIII.

TABLE VIII

Bread Making test

| | | | Aging retardation effects (kg/10 mm) | | |
|---|---|---|---|---|---|
| Experiment No. | Test Specimens | Dough test | 1st day | 2nd day | 3rd day |
| 29 | No. 8 (comparison) Example 3 | Δ | 0.93 | 1.36 | 1.48 |
| 30 | No. 10 (Invention) | O | 0.78 | 1.13 | 1.31 |
| 31 | No. 12 (Invention) | O | 0.80 | 1.18 | 1.33 |
| 32 | Blank | x | 1.08 | 1.55 | 1.65 |
| 33 | Commercially* available emulsifier (for comparison) | O | 0.76 | 1.16 | 1.27 |

*Commercially available Emulsy-MM-100 (manufactured by Riken Vitamin), including 80% of monoglyceride in powder form.

The compositions of this invention are all excellent in both dough test and aging retardation effect.

EXAMPLE 8

Bread making experiments were conducted on test products obtained from Experiment No. 22-A, C; Experiment No. 23-A; Experiment No. 27-B; and Experiment No. 28-B, of Example 6. Bread making tests, dough tests, and aging retardation tests were performed in accordance with methods described in Example 7.

The results are indicated in Table IX.

TABLE IX

Bread Making Test

| | | | Aging retardation effect (kg/10 mm) | | |
|---|---|---|---|---|---|
| Experiment No. | Tested specimens | Dough test | 1st day | 2nd day | 3rd day |
| 34 | Experiment No. 22-A (Comparative example) | O | 0.82 | 1.23 | 1.32 |
| 35 | Experiment No. 22-C (Comparative example) | x | 1.07 | 1.50 | 1.63 |
| 36 | Experiment No. 23-A (Embodiment example) | O | 0.79 | 1.17 | 1.27 |
| 37 | Experiment No. 27-B (Embodiment example) | O | 0.80 | 1.17 | 1.28 |
| 38 | Experiment No. 28-B (Embodiment example) | O | 0.78 | 1.16 | 1.26 |
| 39 | Blank | x | 1.08 | 1.55 | 1.65 |
| 40 | Commercially avail-* able emulsifier for comparison | O | 0.76 | 1.16 | 1.27 |

*Identical to Experiment No. 5 specimen.

It was concluded that the invented composition had excelled in both dough tests and aging retardation effects.

Although the present invention has been described in conjunction with certain specific embodiments thereof, it is not intended to be limited to their embodiments but instead, includes all those embodiments within the spirit and scope of the amended claims.

What is claimed is:

1. A powdered emulsifier composition which is prepared by powdering a monoglyceride composition consisting essentially of 65–85% of a saturated fatty acid monoglyceride and 35 to 15% of a cis-type unsaturated fatty acid monoglyceride, said composition having an iodine value of 10 to 40 tempering the powdered monoglyceride composition for more than 30 minutes at a temperature not below 45° C. to a temperature which does not melt the saturated fatty acid monoglyceride; and cooling.

2. A powdered emulsifier composition which is prepared by mixing a monoglyceride composition consisting essentially of 65–85% of a saturated fatty acid monoglyceride and 35 to 15% of a cis-type unsaturated fatty acid monoglyceride, said composition having an iodine value of 10 to 40, with less than 5% of one or more substances selected from alcohols, organic acids, lecithin and stearoyl lactylate, powdering the resultant mixture; tempering the powdered mixture for more than thirty minutes at a temperature which is not below 45° C. to a temperature which does not melt the saturated fatty acid monoglyceride; and cooling.

3. The emulsifier composition according to claim 2 wherein the organic acid is selected from the group consisting of citric acid, maleic acid, fumaric acid, succinic acid, glutamic acid, tartaric acid and lactic acid; the alcohol is selected from the group consisting of propylene glycol and glycerol; the lecithin is selected from the group consisting of soy bean lecithin and egg yolk lecithin, and the stearoyl lactylate is selected from the group consisting of lactylic stearate, sodium stearoyl-2-lactylate and calcium stearoyl-2-lactylate.

4. A method of improving the quality of starch-containing food which comprises adding to the food an effective amount of the emulsifier composition of claim 1 or 2.

* * * * *